United States Patent [19]
Carrico

[11] Patent Number: 5,297,504
[45] Date of Patent: Mar. 29, 1994

[54] PET WATER SAVER

[75] Inventor: Kenneth S. Carrico, Singer Island, Fla.

[73] Assignee: Pet Life, Inc., West Palm Beach, Fla.

[21] Appl. No.: 14,787

[22] Filed: Feb. 8, 1993

Related U.S. Application Data

[63] Continuation-in-part of Ser. No. 885,188, May 19, 1992, abandoned.

[51] Int. Cl.$^5$ .......................... A01K 5/01; A01K 7/04
[52] U.S. Cl. .......................... 119/61; 119/72; 119/78
[58] Field of Search .................. 119/61, 72, 78, 74, 119/51.5, 51.01

[56] References Cited

U.S. PATENT DOCUMENTS

| | | | |
|---|---|---|---|
| 1,259,253 | 3/1918 | McCullough | 119/74 |
| 2,191,811 | 2/1940 | Trampier, Sr. | 119/51.5 |
| 2,338,072 | 12/1943 | Quinn | 119/78 |
| 2,592,638 | 4/1952 | Andrew | 119/61 |
| 3,076,435 | 2/1963 | Seymour | 119/61 |
| 3,152,576 | 10/1964 | Faurot | 119/51.5 |
| 3,722,476 | 3/1973 | Van Ness et al. | 119/61 |
| 3,749,063 | 7/1973 | Buffum | 119/61 |
| 3,759,228 | 9/1973 | Keen | 119/78 |
| 3,810,446 | 5/1974 | Kightlinger et al. | 119/61 |
| 3,995,595 | 12/1976 | Williams | 119/61 |
| 4,286,546 | 9/1981 | Moore | 119/61 |
| 4,436,056 | 3/1984 | MacLeod | 119/61 |
| 4,470,371 | 9/1984 | Strickland | 119/78 |
| 4,786,205 | 11/1988 | Hisken et al. | 405/52 |
| 4,827,874 | 5/1989 | Mahan | 119/61 |
| 4,886,016 | 12/1989 | Atchley | 119/61 |
| 5,000,123 | 3/1991 | Morse et al. | 119/61 |
| 5,002,017 | 3/1991 | Hollyday et al. | 119/61 |
| 5,133,293 | 7/1992 | Boozer | 119/61 |

FOREIGN PATENT DOCUMENTS 234529 11/1959 Australia ........................ 119/61

Primary Examiner—John G. Weiss
Attorney, Agent, or Firm—Malin, Haley, DiMaggio & Crosby

[57] ABSTRACT

An improved spill-resistant container for transporting animals having an automatic refill feature and a low profile design that allows the animal ease of access to drinking water and resists tipping of the container. Water within the container is prevented from spilling by use of an annular housing that maintains water spillage from an upwardly facing substantially concave internal dish within the housing. The dish defines at least one aperture therein to allow spilled water to reenter the dish for consumption by the animal. The diameter of the rim of the dish is greater than the diameter of an animal access aperture defined by the housing. The dish is attached to a support base that is sealingly attached to the annular housing, the volume external to the dish side and within the annular housing defining an impervious baffling interior chamber. Apparatus may be provided for automatically or manually actuating a flow of water from an external reservoir to refill the dish to a predetermined level.

23 Claims, 6 Drawing Sheets

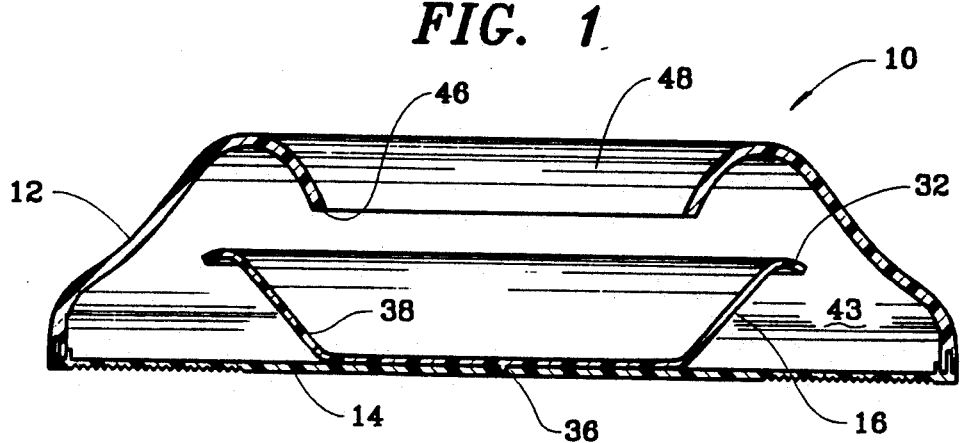
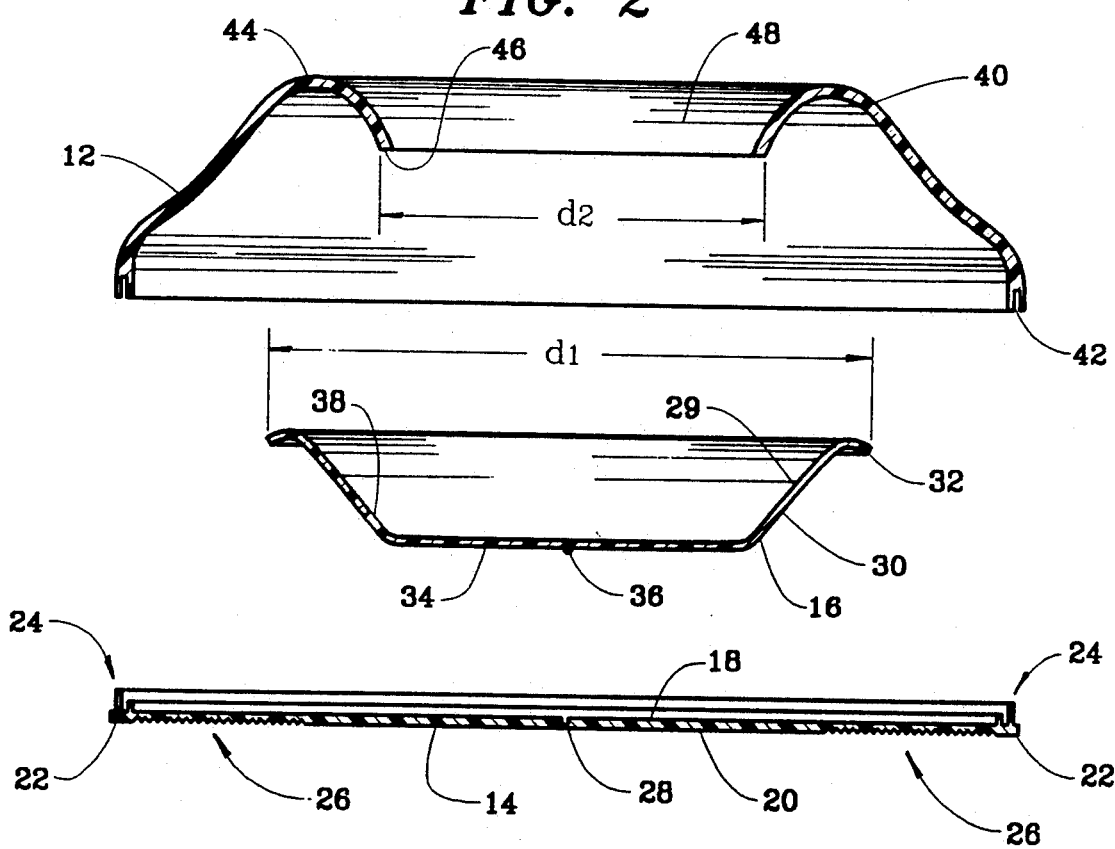

PET WATER SAVER

This is a continuation-in-part of application Ser. No. 07/885,188, filed May 19, 1992, currently abandoned.

BACKGROUND OF THE INVENTION

1. Field of the Invention

This invention relates generally to pet watering devices and, more particularly, to an improved portable pet watering device that permits animals being transported to be watered on demand which device substantially prevents spillage of water in the device during abrupt movement thereof.

2. Description of the Prior Art

All animals, including domestic pets, require water for survival. Typically, the owner of a pet need only maintain a water bowl to provide for pet sustenance. However, transportation of a pet creates peculiar circumstances that do not lend themselves to the conventional water bowl. In addition, transportation places most pets under stress causing an increase in water consumption.

The problem which this invention primarily addresses is the watering of the pet during transportation. The requirements of such watering include the need to prevent water from spilling during movement of the vehicle, the need for maintaining a low center of gravity to prevent the bowl from turning over, and the need for replenishing water during extended trips.

Transporting the animal in a moving vehicle leads to problems based upon the type of vehicle and type of pet to be transported. For example, communities have come to rely upon dogs as the daily partner of police officers. The police dog spends most of its day riding in the back seat of a vehicle while awaiting the call of duty. The dog is provided water by the use of a bowl placed on the floor of the vehicle. However, one vehicle turn may result in the water splashing over the side of the bowl and onto the floor. Failure to refill the bowl is detrimental to the dog's health. Continued refilling of the bowl, if the attendant officer remembers, may result in a soaked floor and unnecessary distractions. Between use, spilling, and/or evaporation, the dog is likely to have little to no access to water. These problems are not limited to automobiles but are inherent in both transportation by commercial and private aviation, boating, campers, and so forth.

To overcome the aforementioned problems, a number of patents have issued in an effort to address the problem. U.S. Pat. No. 3,076,435 issued to Seymour discloses a water bowl that provides constant level maintenance by use of an airtight chamber which provides a low level reservoir and a refill triggering means. However, this device presents a top heavy reservoir unsuitable for moving vehicles. U.S. Pat. No. 3,152,576 issued to Faurot discloses a water bowl having a dished bottom and a conical shaped opening. The conical shape prevents spillage by maintaining sidewall splashing within a void in the bowl. However, Faurot does not teach or suggest a secondary reservoir within the animal watering device, and it requires the animal access aperture to be defined by a frustro-conical truncated cone having sidewalls at an acute angle between 25° and 30°. U.S. Pat. No. 3,749,063 issued to Buffum discloses a device that includes a self-righting, weighted bowl including a means for maintaining horizontal positioning thereof using gravity. U.S. Pat. No. 4,286,546 issued to Moore discloses a dog watering dish utilizing a disc-like member which floats upon the water. The disc member defines a central aperture to provide the animal with a limited access hole for the water. This device has no anti-spill feature and is generally top heavy. U.S. Pat. No. 4,436,056 issued to MacLeod discloses a splash resistant pet bowl having sloping sides used in combination with a snap-in lid. The lid has a central aperture sized to allow the pet access to the water. McLeod lacks a secondary reservoir within the device itself. U.S. Pat. No. 2,191,811, issued to Trampier, Sr., discloses a food and water dish for animals comprising a compartmentalized dish surrounded by an annular overflow trough, which trough is communicated with the water compartment of the bowl. Trampier does not provide anti-splash or anti-spill features, and lacks a secondary reservoir. U.S. Pat. No. 3,995,595, issued to Williams, discloses a feed tray, bowl, or dining mat for animals comprised of a bowl having a pin adapted to mate with a corresponding aperture in an insecticidal mat. U.S. Pat. No. 2,592,638, issued to Andrew, discloses a feeder for livestock or poultry comprising a convex inner dish-shaped element surrounded by a trough, but lacking a secondary reservoir. U.S. Pat. No. 3,759,228 to Keen discloses a pet watering apparatus with a refilling feature, but which lacks a secondary reservoir within the device itself. U.S. Pat. No. 4,470,371 to Strickland discloses an animal watering means with a refilling feature, but which also lacks a secondary reservoir within the device itself. Further, Strickland does not relate to an anti-splash apparatus. U.S. Pat. No. 2,338,072, issued to Quinn, discloses a poultry waterer having an automatic refill means, but which lacks any anti-spill or anti-splash characteristics. Australian Patent No. 234,529, issued to King, discloses a stepped watering device with a hinged cover and a plurality of animal access apertures and lacks any anti-spill features such that if it were tipped even slightly, water would spill therefrom. U.S. Pat. No. 1,259,253, issued to McCullough, discloses a sanitary stock drinking cup which is not portable and lacks means for replenishing the water level when the water level reaches a predetermined point.

While the aforementioned devices disclose various designs to reduce splashing, no device known to the inventor teaches the benefits of a low profile design capable of preventing splashing and having a means for automatically maintaining the water level using both a secondary reservoir built into the device itself and a remote reservoir. Therefore, what is needed in the art is a pet bowl that is readily accessible to any size animal, has a profile that provides a smooth bowl-access aperture that will not harm the animal if the animal is drinking during rough transportation, that is expressly designed for transporting animals, which is portable, and which has a means for automatically filling the bowl from a remote reservoir.

SUMMARY OF THE INVENTION

The present invention provides an improved spill-resistant container for providing water to pets. The device employs a primary reservoir, a secondary reservoir, and, in an alternate embodiment, a tertiary, or remote, reservoir. The primary and secondary reservoirs are fluidly communicated with each other such that as water spills from the primary reservoir into the secondary reservoir, water from the secondary reservoir flows into the primary reservoir to replace spilled water. When the device is righted and spilling terminates, the water levels in the primary and secondary reservoirs remain generally the same. A limited animal access aperture is provided, which allows animal access to the primary reservoir only and is positioned such that water spilling from the primary reservoir into the secondary reservoir cannot exit therethrough.

The invention includes a means coupling the interior of the container to an external reservoir for maintaining a constant water level within the container. The device provides particular benefit when used in a moving vehicle by virtue of its low profile shape that prevents tipping and splashing while providing ease of accessibility to any size animal.

Water within the container is prevented from splashing by use of a sloping concave inner drinking dish having a peripheral lip that directs water which spills therefrom into an internal chamber or secondary reservoir. The dish is either removably or permanently attached to a support base that is sealingly attached, either removably or permanently, to the annular housing and the dish acts as a primary reservoir. The volume defined by the dish side walls and the annular housing defines the impervious secondary reservoir. The side wall of the dish preferably but not necessarily defines at least one aperture for allowing an unimpeded flow of water to and from the secondary reservoir to the interior of the dish. A water level responsive switch may be employed for actuating a flow of water from an external, or tertiary, reservoir to maintain the water in the primary and secondary reservoirs at a predetermined level.

In another embodiment of the invention, the dish is comprised of a series of separable segments which can be removed through the animal access aperture to assist in disassembling, cleaning, and assembly thereof. The configuration of these segments is preferably of a simple construction to facilitate use by the handicapped.

In yet another embodiment of the invention, the inner surface of the dish defines a plurality of curvilinear or curved veins designed to reduce the kinetic energy of water moving either radially or otherwise toward the peripheral lip of the dish by redirecting the flow of water spilling from the primary reservoir.

In yet a further embodiment of the invention, which may be employed with any or all of the above-referenced embodiments, a portion of the container is formed into a 90° angle or other angle to facilitate placement of the bowl in a corner of a cage or otherwise in abutting relationship with vertical surfaces.

In accordance with the present invention, it is an object to provide an improved pet watering container that prevents splashing when used in moving vehicles.

Another object of the instant invention is to provide a low profile watering container that resists tipping and is easily accessible by an animal.

Still another object of the instant invention is to provide a water level control feature in an anti-spill, anti-splash pet watering device for automatically maintaining the water level available to the animal at a predetermined level.

In accordance with these and other objects which will be apparent hereinafter, the instant invention will now become described with particular reference to the accompanying drawings.

BRIEF DESCRIPTION OF THE DRAWINGS

FIG. 1 is a cross-sectional side elevational view of a first, generalized, embodiment of the instant invention;

FIG. 2 is an exploded cross-sectional side elevational view of the first embodiment of the instant invention;

DESCRIPTION OF THE PREFERRED EMBODIMENTS

Figure 3:
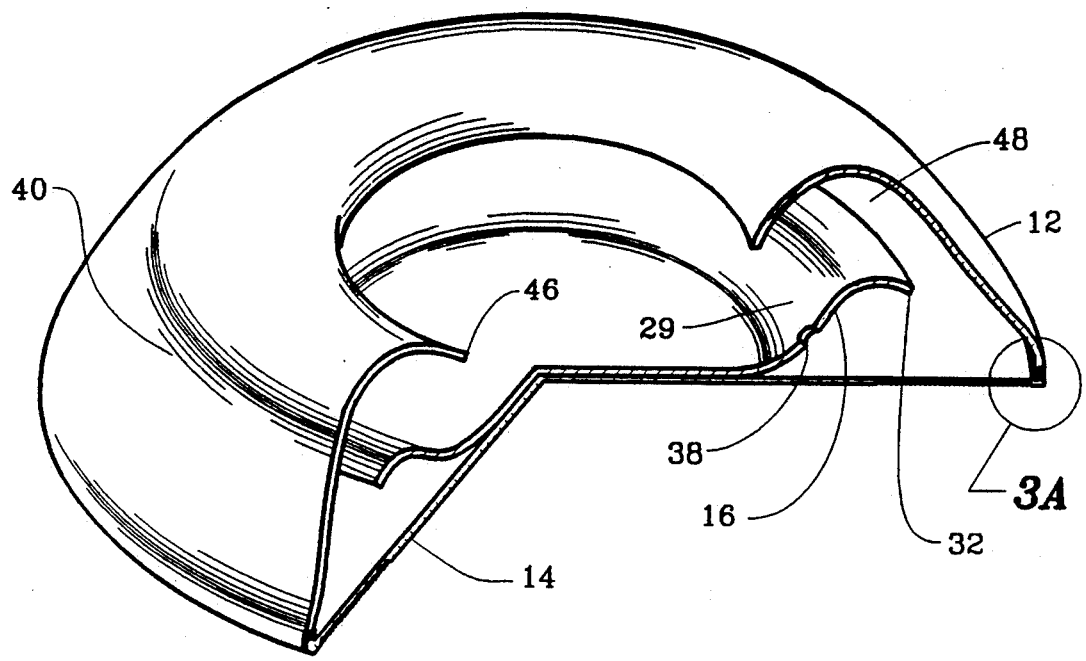
FIG. 3 is a perspective partial cutaway view of the preferred embodiment of the invention.
Figure 3A:
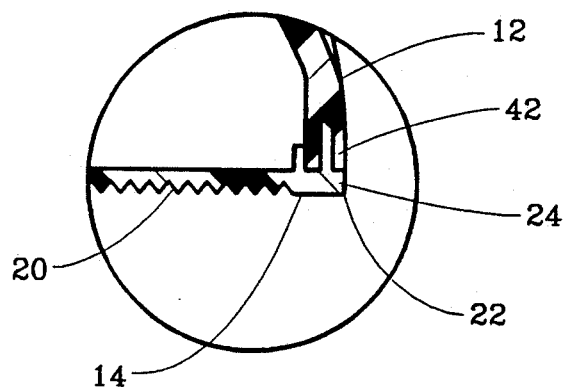
FIG. 3A is an enlarged cross-sectional view of the bowl-base connection detail.

As required, a detailed embodiment of the best mode of practicing the present invention is disclosed herein along with alternative embodiments; however, it is to be understood that the disclosed embodiments are merely exemplary of the invention which may be embodied in various forms. Therefore, specific structural and functional details disclosed herein are not to be interpreted as limiting, but merely as a representative basis for teaching one skilled in the art to variously employ the present invention in virtually any appropriately detailed structure.

With reference made to FIGS. 1-3A in general, the first embodiment of my spill-resistant container is generally depicted by numeral 10. The container is formed from three basic components: an annular housing 12 open at the bottom, a support base plate 14 sized and shaped to cover the open bottom of the housing and a watering dish 16. The support base 14 is formed from a substantially flat horizontal circular member defined by a top surface 18, a bottom surface 20, and a peripheral edge 22. The peripheral edge 22 defines an upstanding male snap-fit member 24 adapted to mate with corresponding female snap-fit member 42 defined by annular housing 12. The lower surface 20 of the base 14 may employ a frictional engagement means to prevent sliding of the bottom surface 20 when placed upon a smooth surface. In the preferred embodiment, a plurality of grooves or ridges 26 are disposed near the outer circumference of the base 14. A centrally disposed tab or dowel 36 is provided for releasably coupling the dish 16 to the base 14 via a corresponding recess 28 defined by base 14. Other attachment structures may be employed. It should be noted that the dish 16 can be permanently attached to the base 14 but, for ease of manufacturing and cleaning, the components are made separable in the preferred embodiment.

The housing 12, base 14 and dish 16 are preferably made from plastic, but may be made of metal, aluminum, wood, silica, rubber or other suitable material. Dish 16 defines an inner surface 29, an outer surface 30, and a peripheral lip 32 of a fixed diameter. The dish has a base 34 and an upper peripheral lip or edge 32 of a first diameter d1 with sloping side walls extending upward and outward in a concave curvature. Animal access aperture 48 is preferably round having a diameter d2. In one embodiment, diameter d2 of animal access aperture 48 should be less than the diameter d1 to prevent water which flows out of dish 16 from flowing, or splashing, out of animal access aperture 48. The outer surface of the bowl base 34 is coupled to the top surface 18 of the support base 14 by tab 36 engageable with recess 28 of base 14. The dish defines at least one aperture 38 for fluidly communicating the interior thereof with the interior of housing 12. Aperture 38 permits water to flow freely from within the confines of dish 16 to the interior chamber 43 defined by cover 12. In this way, if water flows or spills out of dish 16 and into chamber 43, it can return to the confines of dish 16 through aperture 38 such that the animal will again have access to water.

Figure 11:
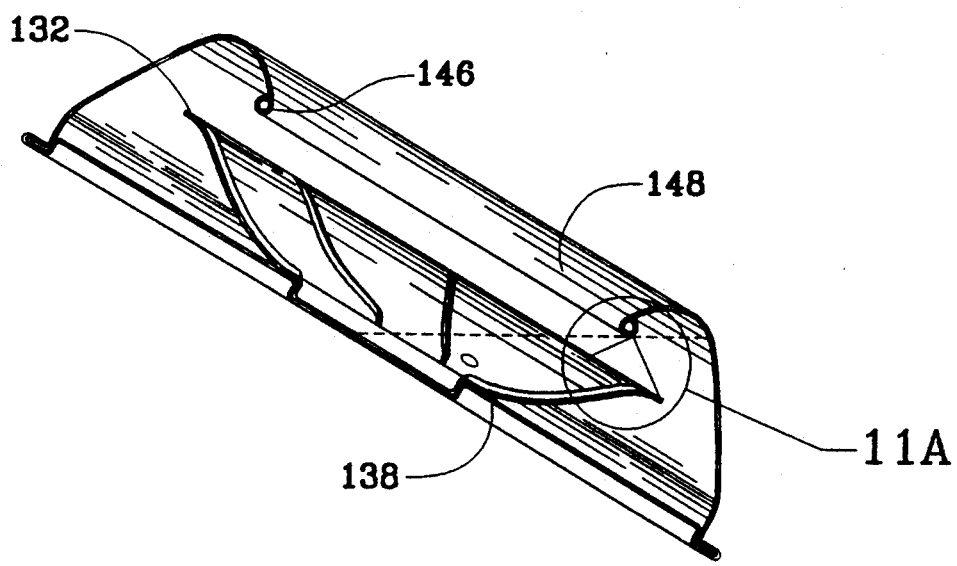
FIG. 11 is a cross-sectional view similar to FIG. 5 with the spill-resistant container tilted to its side.
Figure 11A:
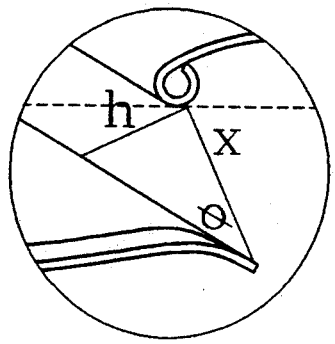
FIG. 11a is an enlarged view of a portion of the tilted spill-resistant container shown in FIG. 11.

FIG. 11 illustrates the spill-resistant container tilted to its side, with the water in primary reservoir 113 remaining substantially parallel to the force of gravity. FIG. 11A illustrates that an optimal distance x between the peripheral lip 132 should be set greater than or equal to the height of the water column depicted by h. The distance x will be equal to the product of the tangent of angle θ and height h. This provision ultimately will prevent water from spilling from the access aperture 148 since the water within primary reservoir 113 will always be below the level of the aperture, even when the container is tilted.

The annular housing 12 has a tapered side wall 40 having said snap-fit member 42 for sealingly connecting to the snap-fit member 24 of support base 14. From the snap-fit member 42, the annular housing extends upwardly and inwardly forming a top ridge 44 and generally downwardly therefrom to a centrally disposed animal access aperture 46, the housing and base defining an impervious baffling interior chamber 43 therein.

Figure 8:
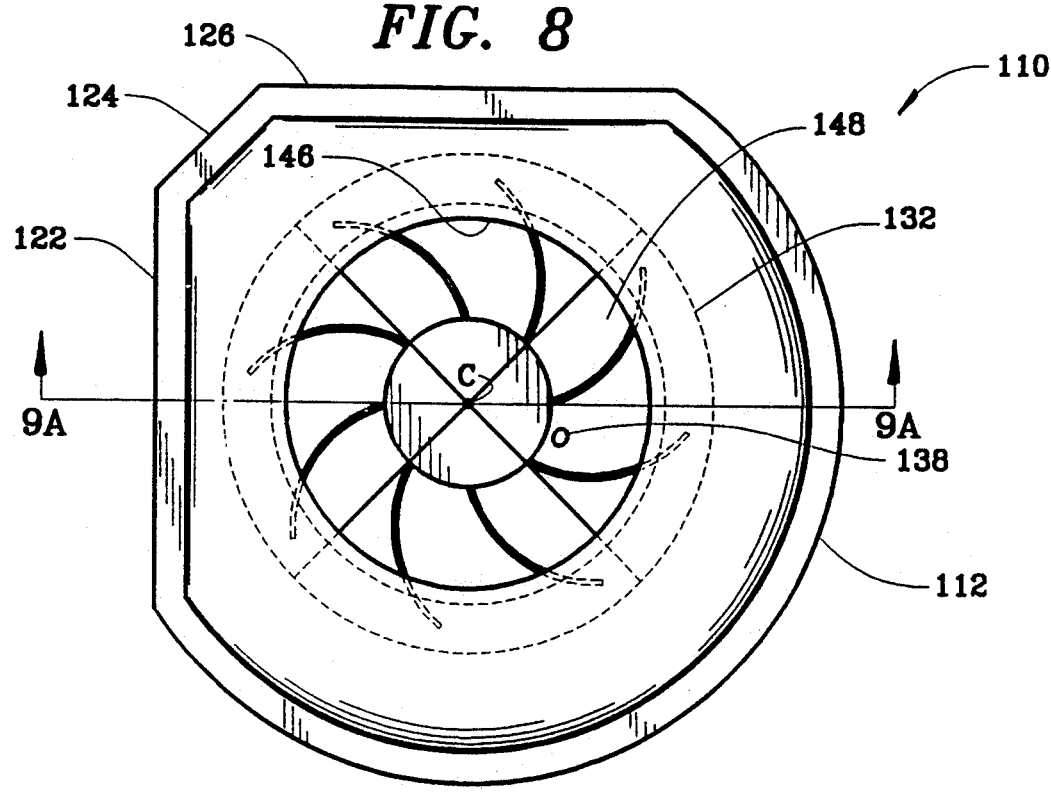
FIG. 8 is a plan view of a fourth embodiment.
Figure 9:
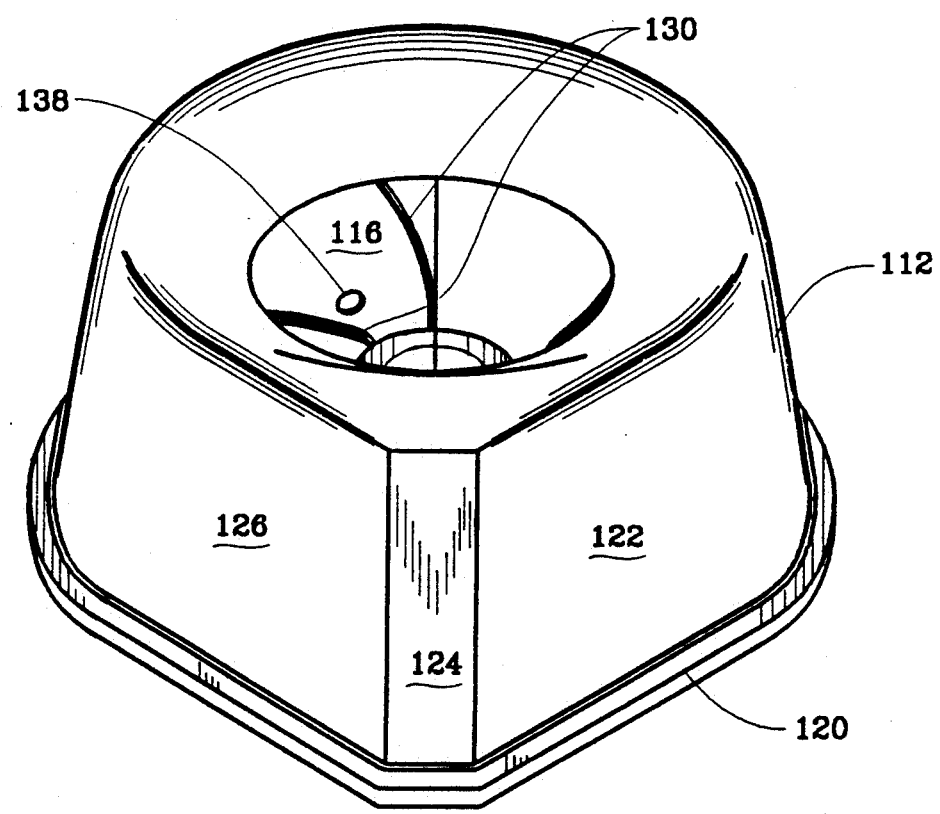
FIG. 9 is a perspective view of the fourth embodiment of the invention.

The bowl's circular configuration when viewed in plan may be altered similarly to that shown in FIGS. 8-9 to facilitate placement of the device adjacent a corner. To accomplish this, the cover and base are made to define planar side edges disposed at right angles to each other. A diagonal segment may or may not be placed between the right angled planar segments. The description of FIGS. 8-9, insofar as the corner placement feature is concerned, is incorporated by reference into the description of FIGS. 1-3A as an alternative embodiment thereto.

Figure 10:
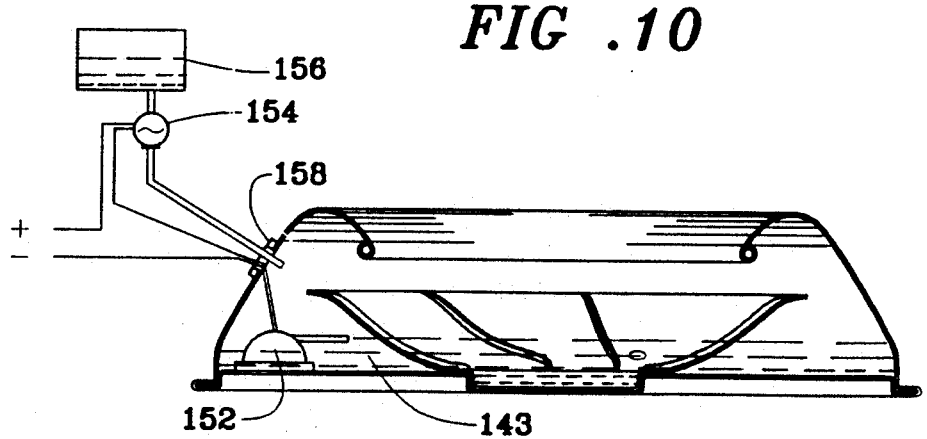
FIG. 10 is a cross-sectional side elevational view of a fifth embodiment of the instant invention with an automatic water level replenishing means depicted.

Water level replenishment means from a remote reservoir such as 156 shown in FIG. 10 may also be utilized with the embodiment shown in FIGS. 1-3A, and the description given in connection with FIG. 10 is incorporated by reference into the description of FIGS. 1-3A as an alternative embodiment thereof.

Figure 4:
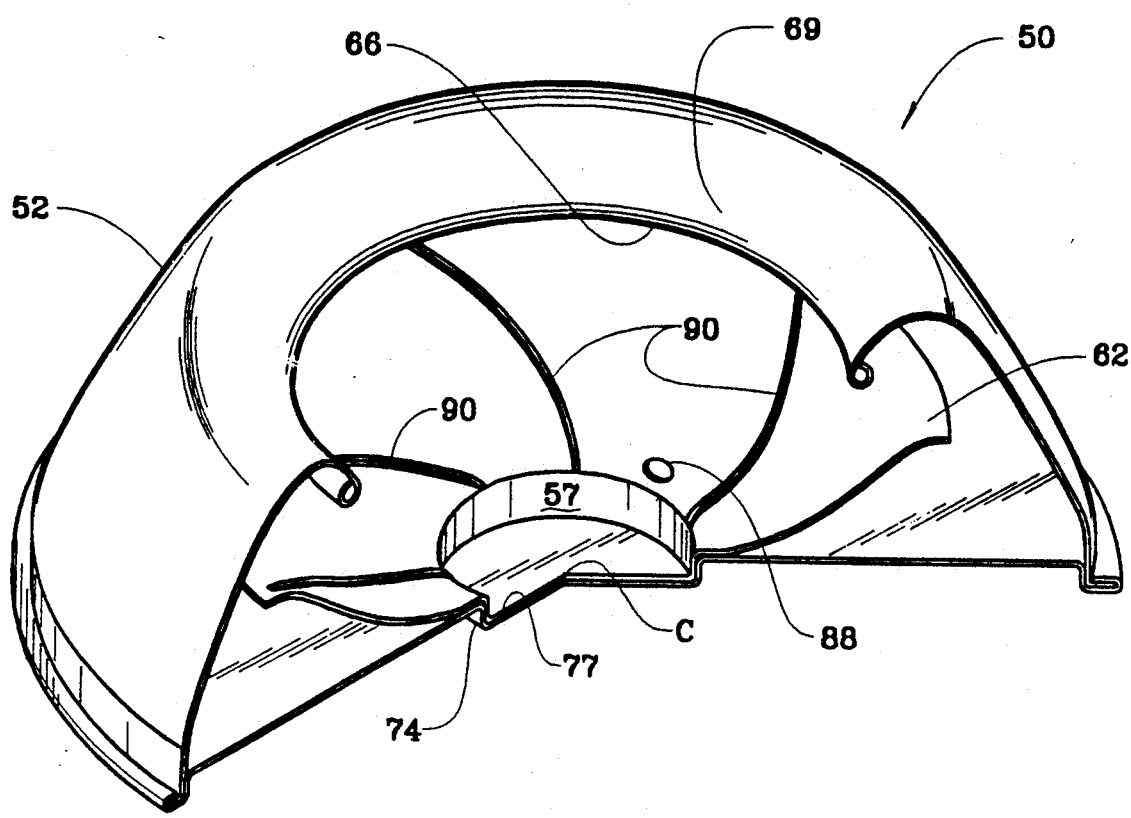
FIG. 4 is a perspective partial cutaway view of a second embodiment of the instant invention.
Figure 5:
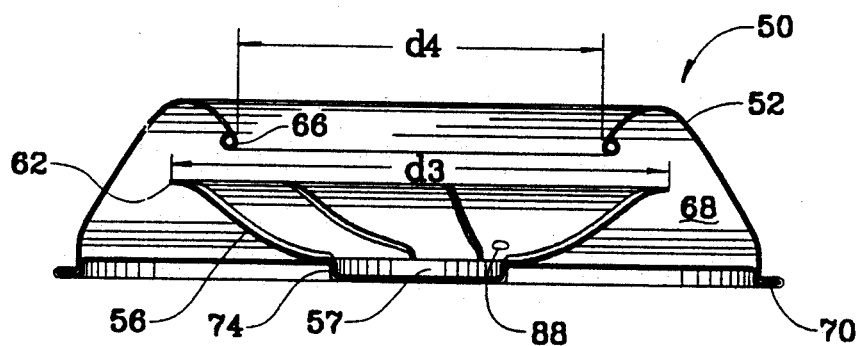
FIG. 5 is a cross-sectional side elevational view of the second embodiment of the instant invention.

FIGS. 4 and 5 show a second embodiment of my invention 50 comprised of an annular housing 52 with tapered sidewall 60 forming the outer housing and a dish 56 mounted therein by coupling to support base 54. The peripheral lip 62 of the dish 56 has, preferably, a diameter d3, greater than diameter d4 of access aperture 66, thus preventing water from exiting dish 56 through aperture 66 even if said water splashes over the peripheral lip 62.

Bowl or dish 56 is provided with a means for attachment to base 54 such as annular ridge 74 which forms a circular depression 77 in the base 54. A corresponding circular depression 57 is adapted to mate with depression 77. Dish 56 is held stationery with respect to base 54 and housing 52 during use.

Aperture 88 is provided in dish 56 to fluidly communicate secondary reservoir 68 with interior of dish 56 to permit drinking water to flow freely therebetween.

Arcuate veins 90 are disposed on the inner surface of dish 56 to act as a means for redirecting, and hence reducing the kinetic energy of, water flowing in dish 56 toward peripheral dish lip 62. These veins preferably curve in the counterclockwise direction with respect to center C of dish 56 for use in the northern hemisphere and clockwise with respect to center C when used in the southern hemisphere so as to counteract the forces brought on by the well-known Coreolius acceleration.

Figure 5A:
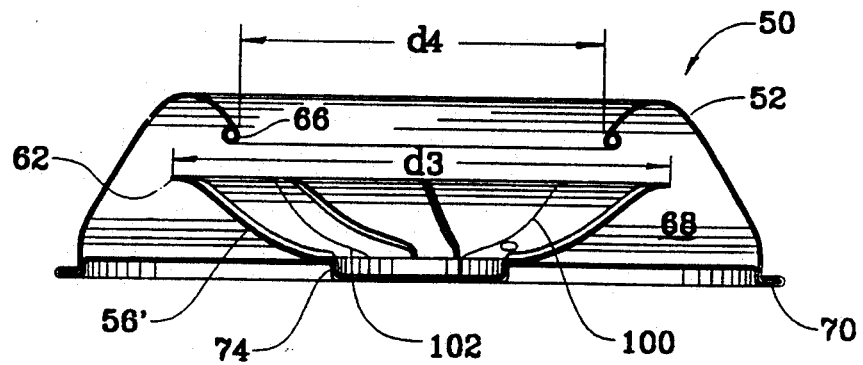
FIG. 5A is a cross-sectional side elevational view of a embodiment of the instant invention taken along lines 5A—5A of FIG. 7.
Figure 6:
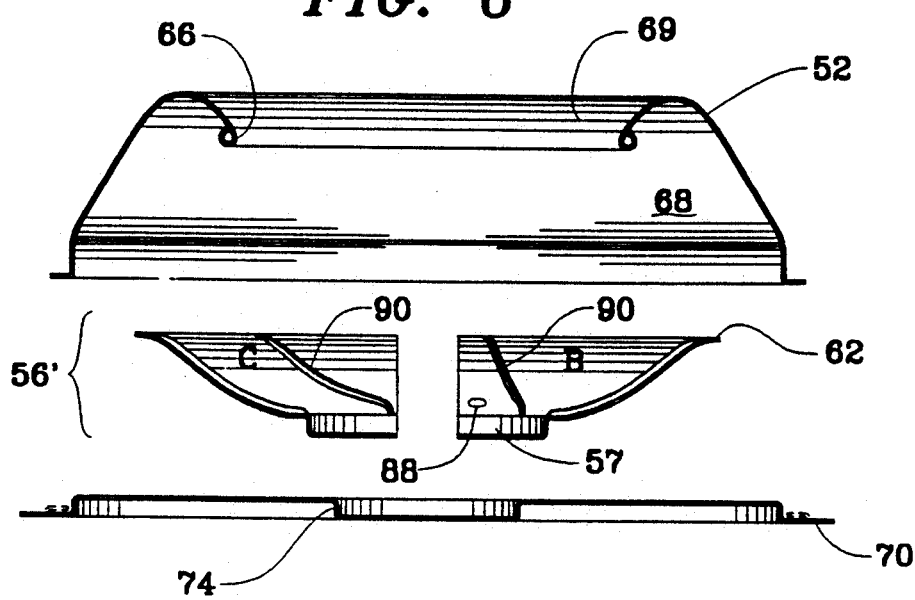
FIG. 6 is a perspective partial exploded cutaway view of the third embodiment of the invention.
Figure 7:
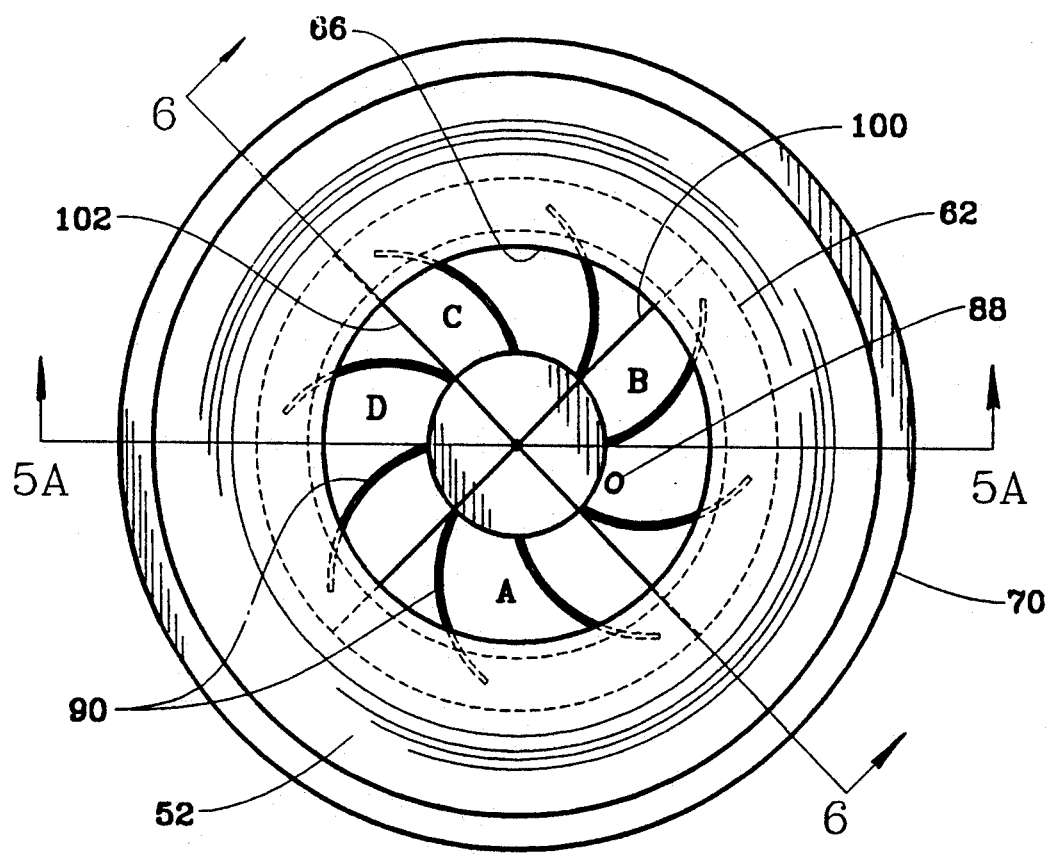
FIG. 7 is a plan view of the third embodiment of the invention.

FIGS. 5A, 6 and 7 show a third embodiment virtually identical to the pet water saver shown in FIGS. 4 and 5, but wherein dish 56 is replaced by a multi-section dish 56'. In the embodiment shown, the dish is broken into four equal quarters A, B, C, and D along perpendicular diameters 100 and 102 with respect to center C. However, the dish may be broken up into any number of convenient sections, so long as the individual section sizes are sized and shaped to fit through animal access aperture 66. The attachment between each section of dish 56' may or may not be watertight. A non-watertight coupling between sections can be particularly beneficial, allowing water in the dish 56' to be fluidly communicated between secondary reservoir 68 and the interior of dish 56'. This feature permits the dish 56' to be removed from within housing 52 for cleaning, etc., even by the handicapped, where the sections are appropriately configured. Dish 56 or dish 56' may, in the alternative, be made of a resilient material which can be deformed by manual manipulation to be made to fit through or be removed from aperture 69.

Figure 9A:
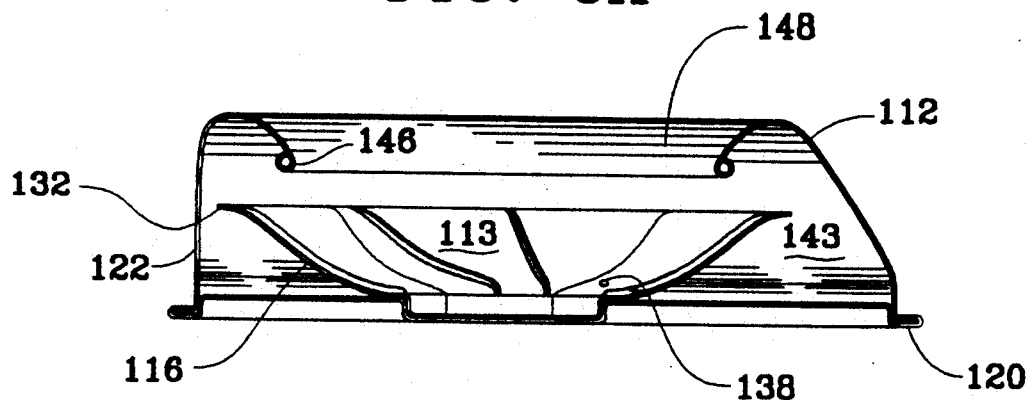
FIG. 9A is a cross section of the fourth embodiment of my invention taken along lines 9A—9A of FIG. 8.

FIGS. 8-9A show a fourth embodiment of my invention wherein an outer cover 112 is connected to a support base 120 defining a secondary reservoir 143. Cover 112 has a centrally located circular lip 146 which defines an animal access aperture 148. A concave watering dish 116 is connected to base 120 within secondary reservoir 143 and forms a primary reservoir 113. Dish 116 defines at least one through aperture 138 fluidly communicating the primary reservoir 113 with the secondary reservoir 143. Dish 116 defines a peripheral lip 132 which preferably has a diameter greater than the diameter of peripheral lip 146.

The device depicted in FIGS. 8-9A is adapted to be placed in the corner of a cage or otherwise located in a 90° corner. Outer cover 112 is formed having planar side segments 122 and 126 which are oriented at right angles to each other. Intermediate diagonal surface 124 may also be utilized joining surfaces 122 and 126 if desired. This configuration permits secure placement of the watering device in the corner of a cage or against vertical support surfaces in a vehicle.

Now referring to FIG. 10, there is shown a water level replenishing arrangement comprised of a water level responsive switch 152 mounted within the secondary reservoir of any embodiment described herein for maintaining a constant water level 154 for watering the animal. Switch 152 can be a mercury switch, float valve, reed switch or like switch for detecting changes in water level. When the water level W drops due to use or evaporation, the switch operates a transfer pump 154 for transferring water from a remote reservoir 156 through the access aperture 158. The reservoir may be mounted in the trunk of a vehicle, a seat in the vehicle, a cargo area of an airplane, a mobile camper, and so forth. Water transferred from the reservoir 156 through pump 154 flows into the dish 115 through aperture 138.

The animal can consume water through aperture 148 whenever it desires without reliance upon the attendant. The water is constantly refreshed by maintaining a predetermined water level within the container. If the container is tipped, bumped or otherwise moved, the water in the dish flows either over curved dish lip 132 or through aperture 138 into chamber 143. The aperture 148 has a smaller diameter opening than the dish peripheral lip 132 for this purpose. If the container is turned vertically, the water is trapped between the base and the interior chamber. When the container is righted, the dish will be refilled as water in secondary reservoir 143 fills dish 116 through aperture 138. Electrical power for the pump 154 may be provided by any known means such as vehicle power or a portable battery for self contained operation.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A spill-resistant container for animals comprising:
    a support base;
    a dish coupled to said support base defining a generally circular upper peripheral rim and at least one aperture fluidly communicating the interior of said dish with the exterior thereof; and
    a housing means sealingly connected to said support base and extending upwardly and inwardly forming an upper ridge and therefrom extending generally downwardly and inwardly to define a centrally disposed generally circular animal access aperture therethrough, water being moveable from the exterior of said dish through said aperture to the interior of said dish for maintaining a constant level of water in the dish, the diameter of said peripheral rim being greater than the diameter of said animal access aperture.

2. The container recited in claim 1, wherein said dish is further characterized as having a flat base of a diameter less than said animal access aperture with curved side walls extending upward and outward in a concave curvature to said peripheral rim having said fixed diameter greater than said animal access aperture.

3. The container recited in claim 2, wherein said curved side walls of said dish define a circular section when viewed normal to said flat base.

4. The container recited in claim 1, wherein a bottom surface of said support base includes a frictional engagement means to prevent sliding of said bottom surface when placed upon smooth surfaces.

5. The container recited in claim 4, wherein said frictional engagement means comprises grooves disposed adjacent a peripheral edge of said support base.

6. The container recited in claim 1, wherein said housing means is sealingly connected to said support base by means of a U-shaped striated receptacle located along a peripheral edge of said support base for engageable coupling to a mating U-shaped striated receptacle located along an opposing peripheral edge of said housing means.

7. The container recited in claim 2, wherein said peripheral rim of said dish comprises a lip for preventing water from escaping from said housing means.

8. The container according to claim 2, wherein the outer surface of said dish has a centrally disposed tab for coupling to said support base.

9. The container recited in claim 1, wherein at least one of said support base, said dish, and said housing means are fabricated from plastic.

10. The container recited in claim 1, wherein said housing means comprises means for automatically maintaining water at a predetermined level.

11. The container recited in claim 10, wherein said means for automatically maintaining water comprises a level switch operatively associated with an external reservoir having a transfer means.

12. The container recited in claim 1, wherein said dish is made of a resilient material which is deformable by manual manipulation for removal through said annular animal access aperture.

13. The container recited in claim 1, wherein the lower portion of said dish includes a tab centrally disposed for providing coupling with a corresponding recess in said base.

14. The container recited in claim 1, wherein said housing means comprises an outer cover having substantially planar sides adjacent, and at right angles, to each other such that said housing means fits snugly in a 90° corner.

15. The container recited in claim 1, wherein said dish includes arcuate veins disposed on an interior portion of said dish for redirecting water flowing within said dish to reduce kinetic energy of the flowing water.

16. The container recited in claim 15, wherein said arcuate veins form a spiral pattern around the center of said dish.

17. An automatically refillable spill-resistant container for animals comprising: a support base formed by a substantially flat horizontally placed structure defined by a top surface, a bottom surface, and a peripheral edge having a U-shaped striated receptacle located along said peripheral edge; a frictional engagement means to prevent sliding of said bottom surface when placed upon smooth surfaces; a dish having an inner surface, an outer surface, and a peripheral lip of a fixed diameter, said dish having a flat base of a first diameter with curved side walls extending upward and outward in a concave curvature to said peripheral lip having a second diameter, the second diameter greater than the first diameter, said inner surface forming a substantially concave curvature, said outer surface coupled to said top surface of said support base, said dish having at least one aperture located on said inner surface fluidly communicated with said outer surface of said dish; housing means comprised of a curved side wall having a U-shaped striated receptacle for sealingly connecting to said support base; and a means for automatically maintaining water at a predetermined level by coupling to an external reservoir.

18. The container recited in claim 17, wherein said means for automatically maintaining water is characterized as a level switch electrically coupled to a pump operatively associated with an external reservoir.

19. The container recited in claim 17, wherein said dish is made of a resilient material which may be deformed by manual manipulation for removal through said annular housing means.

20. The container recited in claim 17, wherein said flat base of said dish includes a tab centrally disposed for providing a coupling with a corresponding recess in said support base.

21. The container recited in claim 17 wherein said housing means further comprises substantially planar sides adjacent, and at right angles, to each other such that said housing means fits snugly in a 90° corner.

22. The container recited in claim 17, wherein said dish includes arcuate veins disposed on the inner surface of said dish.

23. The container recited in claim 22, wherein said arcuate veins are curved with respect to the center of said dish for re-directing water flowing within said dish to reduce kinetic energy of the flowing water.

* * * * *